United States Patent [19]

Boulton

[11] Patent Number: 4,937,821

[45] Date of Patent: Jun. 26, 1990

[54] PIPELINE INFORMATION DELIVERY SYSTEM

[75] Inventor: David A. Boulton, San Jose, Calif.

[73] Assignee: Readtronics, San Jose, Calif.

[21] Appl. No.: 7,058

[22] Filed: Jan. 27, 1987

Related U.S. Application Data

[63] Continuation-in-part of Ser. No. 821,580, Jan. 21, 1986, abandoned.

[51] Int. Cl.$^5$ .............................. H04H 1/08; H04J 1/02
[52] U.S. Cl. .................................. 370/124; 370/69.1; 370/120; 370/73; 358/86; 455/3
[58] Field of Search ................. 370/69.1, 120, 121, 370/122, 71, 73, 124, 76; 358/86, 142, 141; 45/3, 4, 5, 6

[56] References Cited

U.S. PATENT DOCUMENTS

| | | |
|---|---|---|
| 3,342,941 | 9/1967 | Kondo ................................. 370/120 |
| 3,717,844 | 2/1973 | Barret et al. . |
| 3,832,494 | 8/1974 | Seim et al. . |
| 3,860,873 | 1/1975 | Ringstad ............................. 370/122 |
| 3,917,906 | 11/1975 | Johnson et al. . |
| 4,078,245 | 3/1978 | Johnson et al. . |
| 4,365,331 | 12/1982 | Biba et al. . |
| 4,449,218 | 5/1984 | Strehl . |
| 4,491,983 | 1/1985 | Pinnow et al. . |
| 4,521,881 | 6/1985 | Stapleford et al. . |
| 4,538,174 | 8/1985 | Gargini et al. . |
| 4,556,973 | 12/1985 | Uemura . |
| 4,567,512 | 1/1986 | Abraham . |
| 4,590,516 | 5/1986 | Abraham . |
| 4,601,045 | 7/1986 | Lubarsky . |
| 4,787,085 | 11/1988 | Suto et al. ............................... 455/6 |
| 4,788,675 | 11/1988 | Jones et al. ........................ 370/69.1 |

Primary Examiner—Benedict V. Safourek
Assistant Examiner—Wellington Chin
Attorney, Agent, or Firm—Townsend and Townsend

[57] ABSTRACT

An information delivery system which continuously provides sets of information which can be selected by a user. Digital data is encoded as analog signals which are used to amplitude modulate a carrier signal. A plurality of such modulated carrier signals, each constituting a subchannel, are mixed together to form a single channel which can be delivered to a user over a cable or otherwise. The data provided on each carrier in the channel constantly repeats itself so that the entire set of data on a particular carrier wll be available to a user in a relatively short time regardless of the time of access by the user. A first subchannel contains an index to the remaining subchannels to allow user selection of a particular set of information.

9 Claims, 7 Drawing Sheets

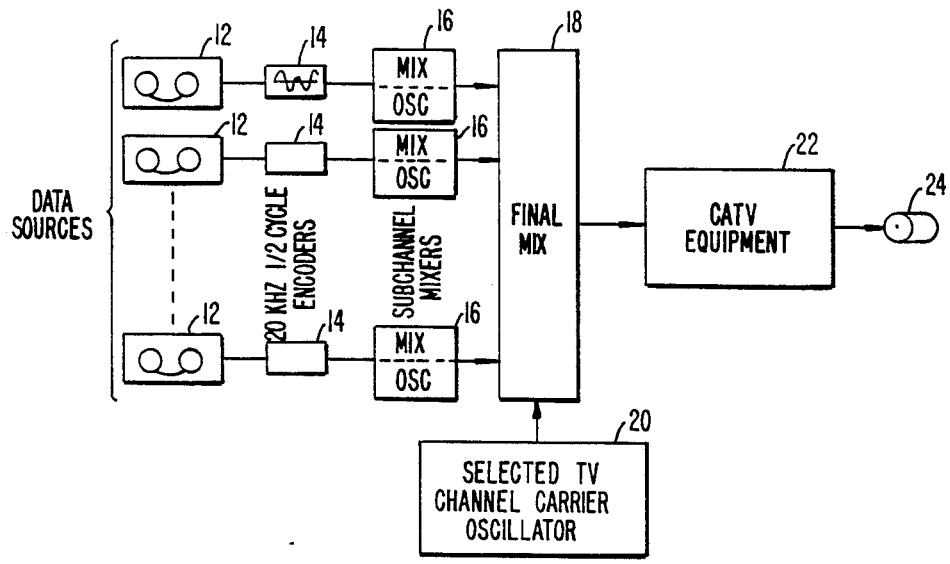
FIG._1A.
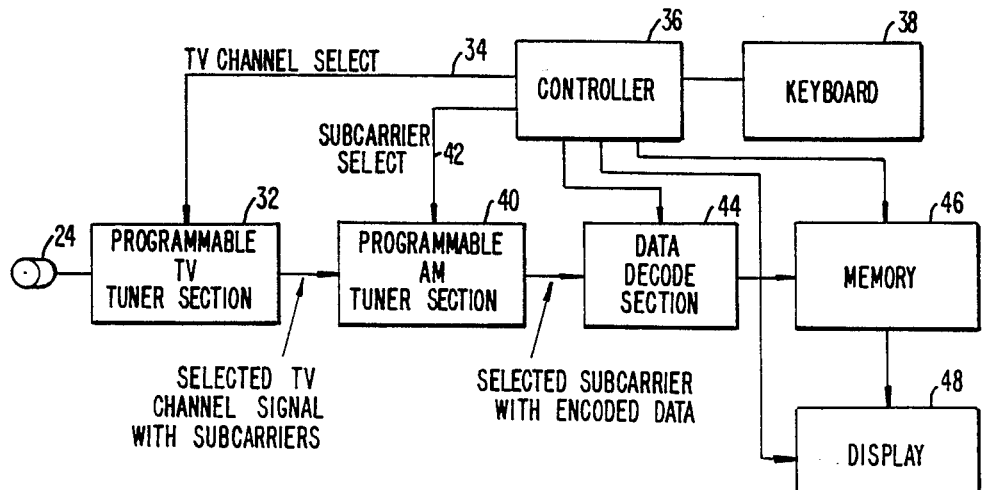
FIG._2.

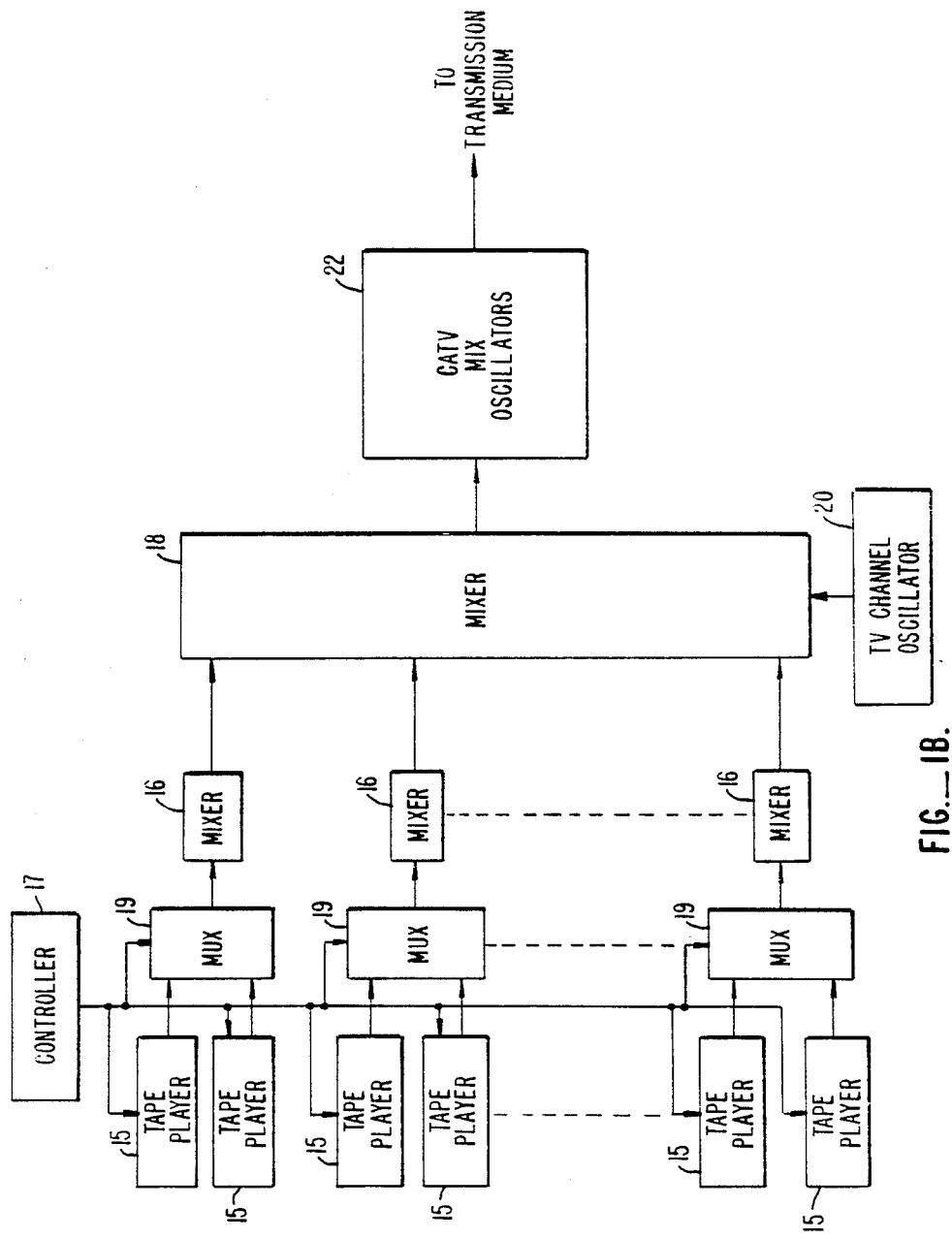
FIG._1B.

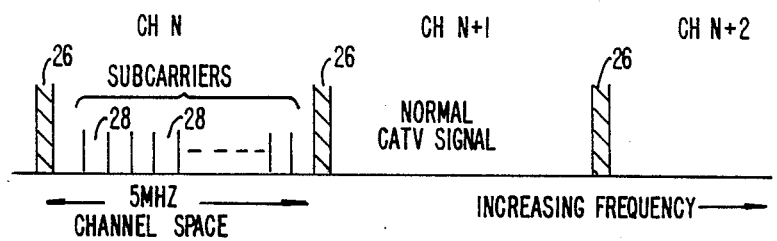
FIG._3.
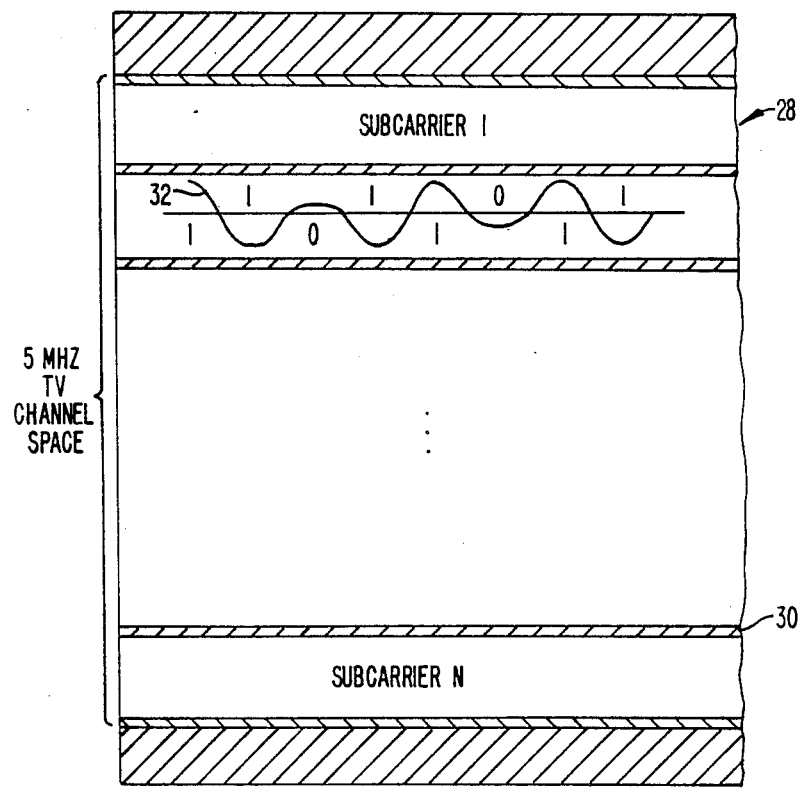
FIG._4.

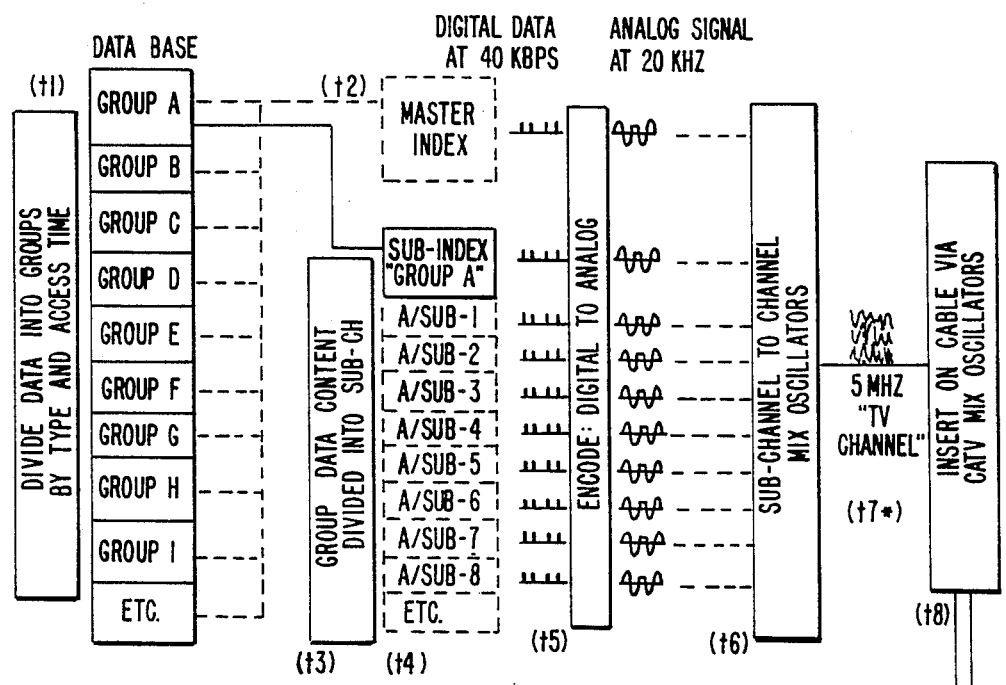
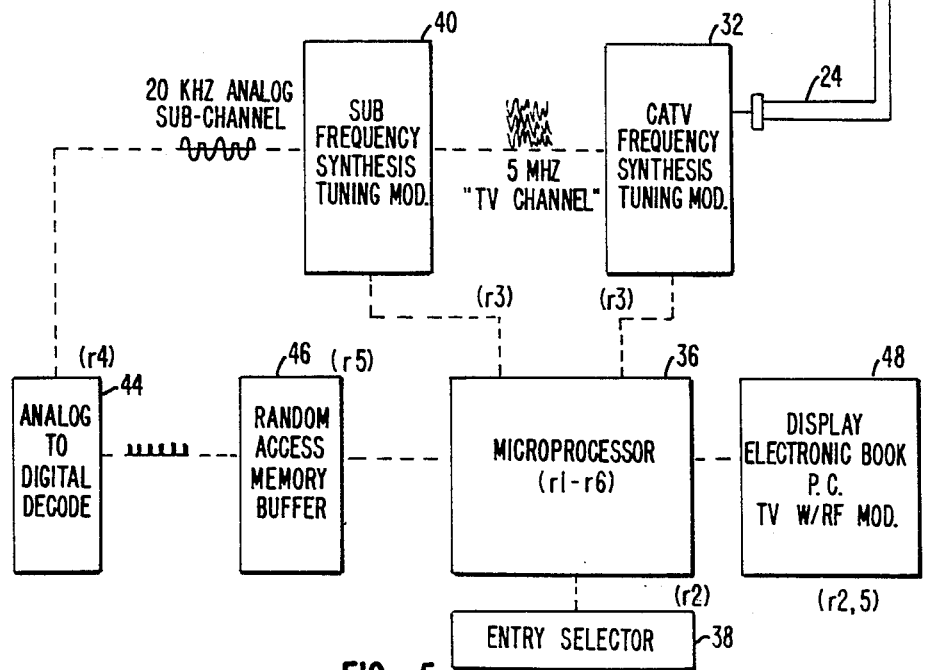
FIG._5.

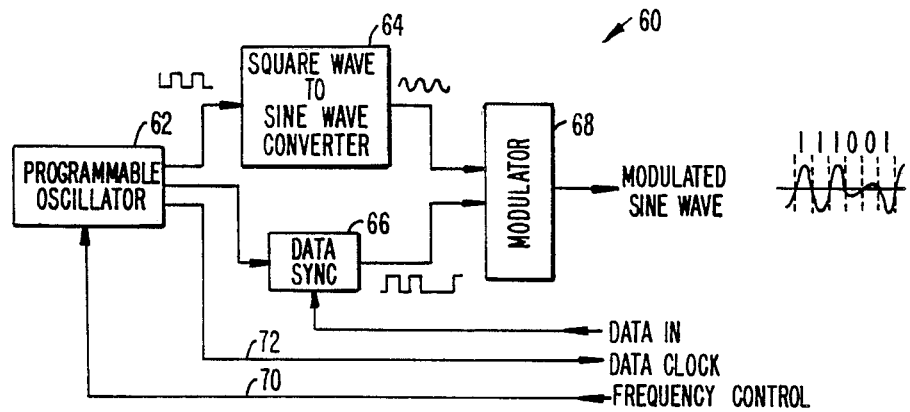
FIG._6.
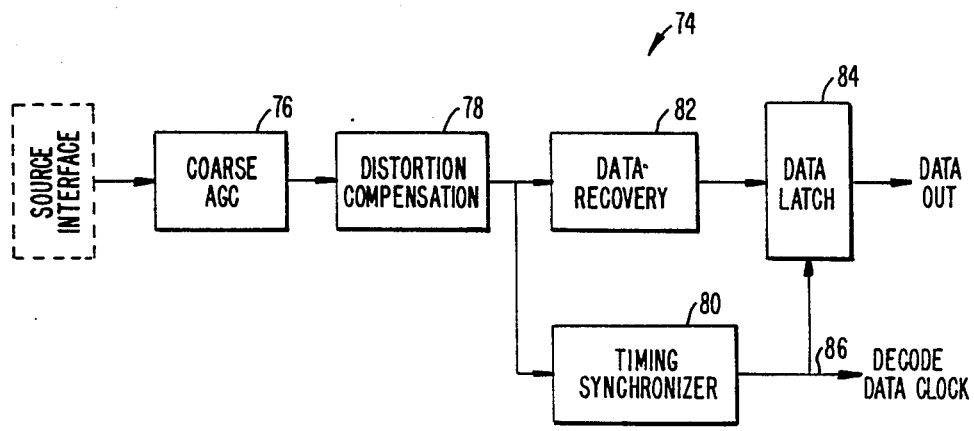
FIG._8.

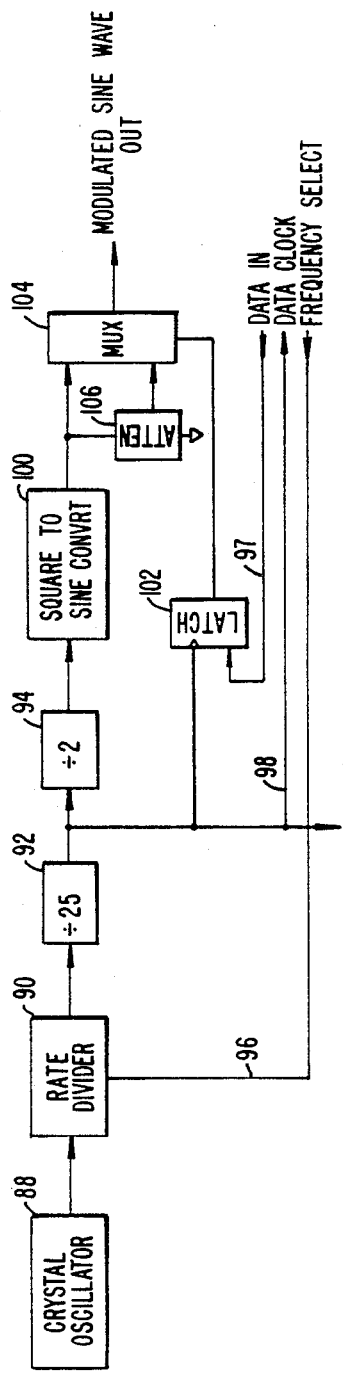
FIG._7.
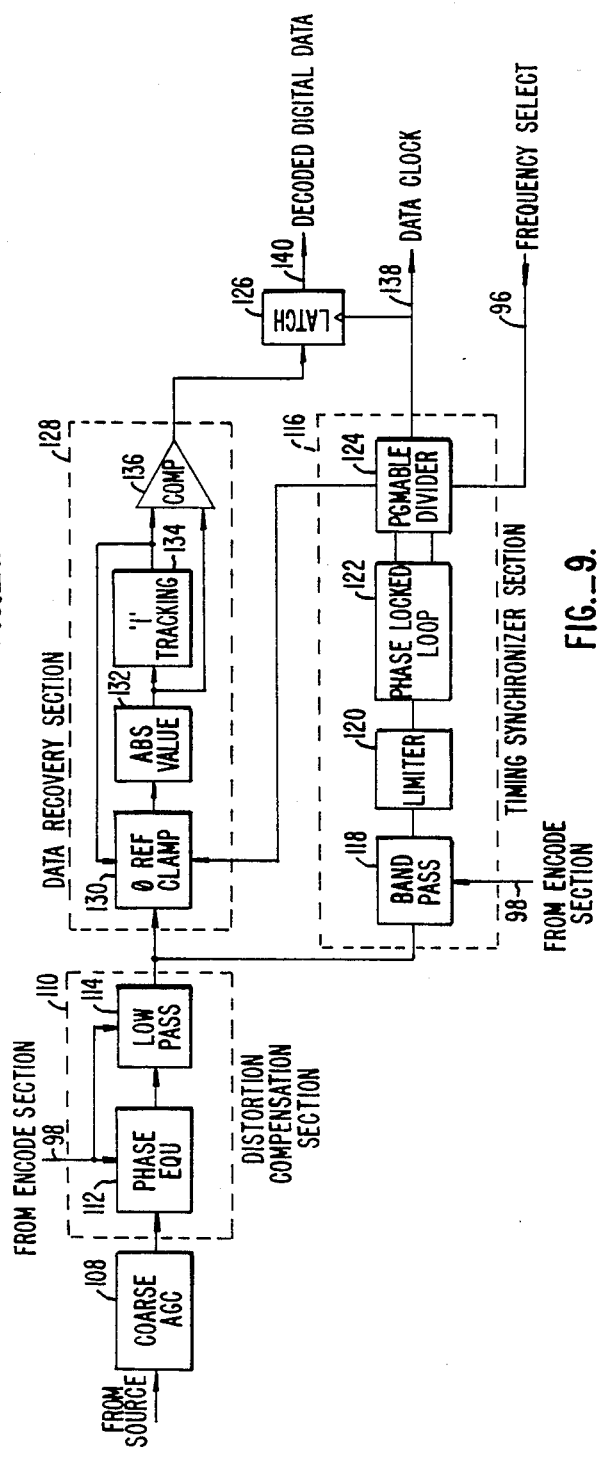
FIG._9.

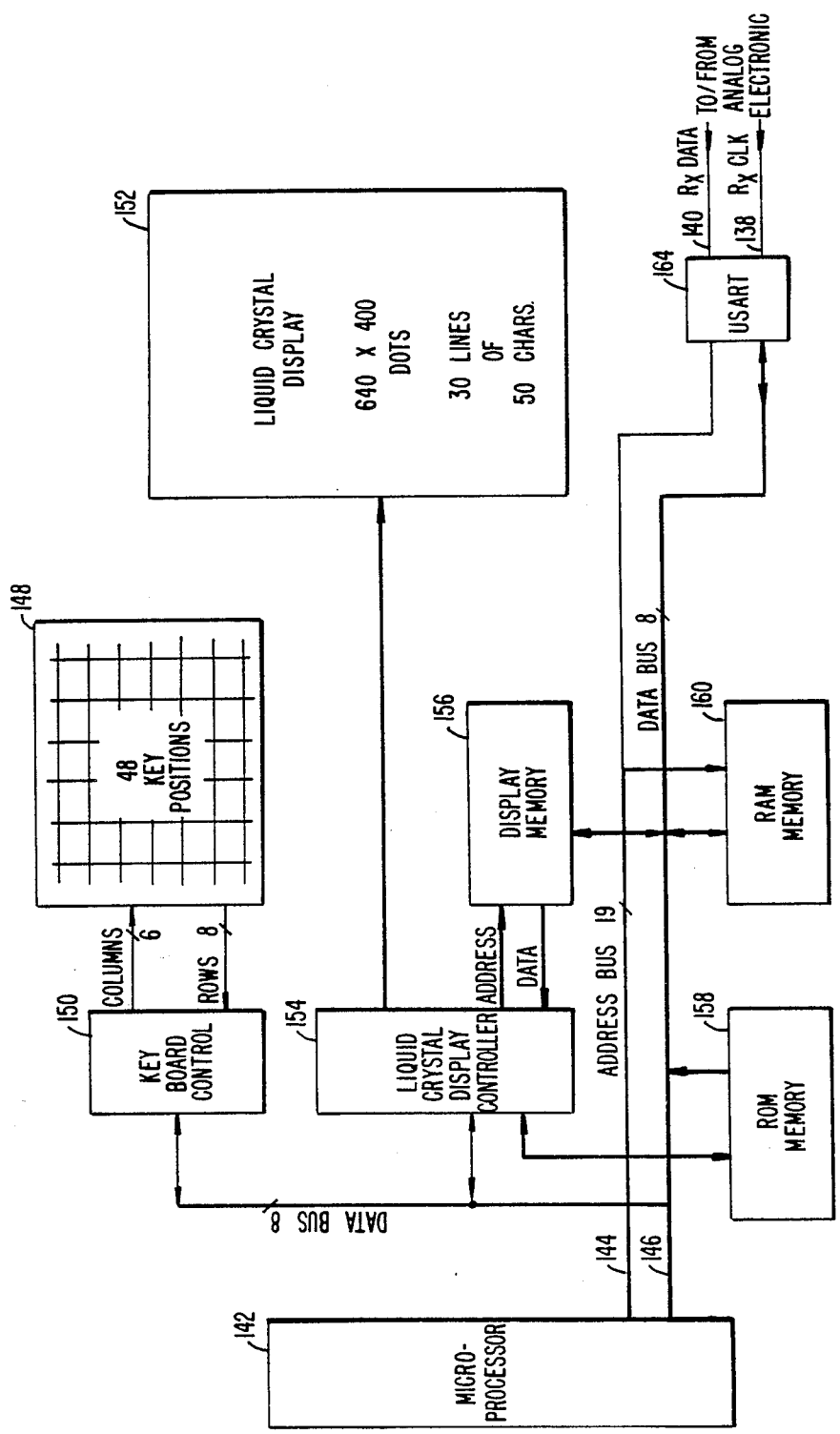
FIG._10.

PIPELINE INFORMATION DELIVERY SYSTEM

This is a continuation-in-part of application Ser. No. 821,580, filed Jan. 21, 1986, now abandoned.

BACKGROUND OF THE INVENTION

The present invention relates to systems for delivering reference information to a plurality of users.

Passive, or reference information, is stored principally in ways which require the user to access a desired field of information in an individual and unique way. On-line services provide data to the user by responding to his specific request and accessing and serving the data uniquely to him. CD-ROM and other mass data storage techniques are designed to provide one bit of data to any one user at any given time. These delivery approaches provide rapid and random access but are not conducive to providing a large group of users with economical access to information. Requiring the user to have a computer, a modem, and in the case of CD-ROM an expensive peripheral device and subsequently expensive software on the disk, these systems are economically impractical for mass distribution. The nature of these systems is to provide a single user with data and information in a way which provides the user random selection. Systems exist to "network" together multiple users but no system currently exists to deliver mass information economically and simultaneously to a large group of users, while still providing each user individual random selection.

Information can be distributed from a source to a plurality of users in some systems, such as local area networks, by arbitrating between users according to varied schemes to provide one user access at any given time. In the video and audio technologies, video and audio signals are provided to a plurality of users over TV channels or radio channels, but individual users have no control over the selections they are provided other than choosing between the different channels.

SUMMARY OF THE INVENTION

The present invention is an information delivery system which continuously provides sets of information which can be selected by a user. Digital data is encoded as analog signals which are used to amplitude modulate a carrier signal. A plurality of such modulated carrier signals are mixed together to form a single channel which can be delivered to a user over a cable or otherwise. The data provided on each carrier in the channel constantly repeats itself so that the entire set of data on a particular carrier will be available to a user in a relatively short time regardless of the time of access by the user.

An extraction mechanism operated by the user selects the channel and selects a first carrier which contains index information. The carrier signal is decoded and the digital data is stored in a buffer memory whose contents are supplied to a display under the control of the user. The buffer memory only holds a portion of the set of data on a particular carrier. As the user transfers the data to the display screen, new data is added in the space vacated in memory. Upon viewing the index, the user can select the data desired to be viewed. Different portions of the index correspond to different carriers which can be selected to provide the particular data. For example, where data comprises an encyclopedia, the subjects beginning with letter C might be contained on the third carrier (or subchannel).

Utilizing up to a 20 KHz signal per subchannel, up to 75 such subchannels are multiplexed into a conventional 5 MHz TV channel. This process is repeatable up to the maximum capacity, in TV channels, of any given carrier; i.e., microwave, conventional broadcast or cable. The signals are multiplexed in this fashion to allow for the inexpensive extraction using standard random access frequency synthesis tuning chips. Two such chips; one, exactly as found in modern video recorders and cable ready TV sets, performs the gross tuning to the desired channel within the available channels, the second, similar to those found in AM radios, is used to tune the desired subchannel.

As an example, one traditional 75 ohm coax cable could carry up to 80 TV channels, with each such channel carrying 75 subchannels and with each subchannel operating at 20 KHz. With each half cycle amplitude modulated per digital bit encoded, one such cable can deliver 40K bits per second per subchannel (4K bytes), 3 M bits per second per channel (300K bytes) for a total system capacity of 1.44 billion bytes per minute. Any information desired within the overall system can be simply extracted by an operating system which provides input selection to the two tuning devices. Once the desired subchannel has been bandpass isolated, digital decoding from the analog signal presents any desired digital device with the original data content. Since the subchannels are analog, the system can also deliver voice or music.

Applications for the technology include home delivery of the aforementioned types of information via cable operators. Where dedicated cables exist or can be installed, mass data access by virtually unlimited numbers of individuals in schools, hospitals and business complexes can be rendered economically practical.

The encoded analog data is preferably in the form of a sine wave of approximately 10-20 KHz. Each half-cycle of the sine wave is amplitude modulated to indicate either a digital zero or a digital one. Preferably, a six-bit code is used to identify up to 63 characters which would represent the alphabet, the basic digits, and 27 punctuation and control characters. This six-bit hex code can be contained within three analog cycles. A different number of bits or code may be used if desired, especially if graphic or pictorial data is presented. Any type of data may be presented, whether it is text, graphics, pictorial or otherwise. By using an analog signal to modulate the carrier signal, rather than a series of positive pulses, the bandwidth required for the carrier is cut in half.

For a further understanding of the nature and advantages of the invention, reference should be made to the ensuing detailed description taken in conjunction with the accompanying drawings.

BRIEF DESCRIPTION OF THE DRAWINGS

FIG. 1A is a block diagram of a first preferred embodiment of a transmission system according to the present invention using digital data sources;

FIG. 1B is a block diagram of a second preferred embodiment of a transmission system according to the present invention using analog data sources;

FIG. 2 is a block diagram of a data extraction system according to the present invention;

FIG. 3 is a diagram of the multiple TV channels used in the present invention;

FIG. 4 is a diagram of the subcarriers in a single channel of FIG. 3;

FIG. 5 is a combination flowchart and block diagram showing the movement of information;

FIG. 6 is a general block diagram of the encode electronics of FIG. 1;

FIG. 7 is a detailed block diagram of the encode circuit of FIG. 5;

FIG. 8 is a general block diagram of the decode electronics of FIG. 3;

FIG. 9 is a detailed block diagram of the decode circuit of FIG. 7; and

FIG. 10 is a block diagram of the digital electronics of FIG. 2.

DETAILED DESCRIPTION OF THE PREFERRED EMBODIMENTS

FIG. 1A shows a transmission system according to the present invention. A series of digital data sources 12 continuously provide digital data to encoders 14. Encoders 14 convert the digital data into analog form and supply the analog signal to a mixer 16. Each mixer 16 uses the encoded analog signal to modulate a carrier signal, with each mixer 16 utilizing a different carrier frequency. The outputs of mixer 16 are combined in a final mixer 18 under the control of an oscillator 20 for the selected TV channel. The TV channel output is supplied to CATV equipment 22 for combination with other TV channels and transmission along a TV cable 24.

Alternately, digital data is recorded on a plurality of tapes 15 by a single encoder 14. The analog signals from the tapes are supplied directly to mixers 16 as shown in FIG. 1B. Two identical tapes can be used for each channel, with one tape providing back-up while the other is rewinding. The control and switching of the tapes 15 at the proper time is done by a controller 17 and multiplexers 19.

Yet another alternate to the embodiment of FIG. 1B would be to record the signals after modulation at the output of mixers 16 and supply the signal directly to mixer 18. In yet another embodiment, the signal from the output of mixer 18 could be recorded on a videotape with the tape output, containing all the multiplexed and mixed signals, being supplied directly to the CATV equipment 22. The advantage of the embodiment of FIG. 1B is that one portion of the data bank can be changed without affecting the other portions. The advantage of the embodiment of FIG. 1A is that a digital data source 12 can be changed in real time with an appropriate computer input.

FIG. 3 shows a number of 5 MHz TV channels transmitted by CATV equipment 22. Each channel is separated by a channel guard band 26 and includes a number of subcarriers or subchannels 28.

Subchannels 28 are shown in more detail in FIG. 4. Each subchannel 28 is separated by a subcarrier guard band 30. The carrier frequency for each subcarrier is modulated by an analog signal such as analog signal 32. Signal 32 is an amplitude modulated sine wave with the peak of the sine wave being truncated to indicate a zero and being unchanged to indicate a digital one.

For example, the letter "A" may be represented by the digital code 1 0 0 0 0 0. This digital code is used to modulate the sine wave carrier, with each half-cycle being amplitude clipped to indicate a zero, and being unaffected to indicate a digital one.

Three cycles therefore provide the capacity to encode any one of up to 63 characters. Two additional cycles can be used for purposes of check summing and identity separation. Thus, with five cycles assigned to carry each character, and utilizing a 10 KHz base cycle, 2,000 characters per second can be encoded. Graphic and pictorial data can also be presented. Additional bits may be used for graphic data to give, for example, a total of 10 bits.

The data in each subchannel is constantly repeated. Subchannel 1 is an index for the remainder of the subchannels and is the first channel accessed by a user. After selecting a desired set of data to be viewed upon viewing the index, the user can select a particular subchannel, as indicated by the index in subchannel 1, which will contain the desired set of data.

FIG. 2 is a block diagram of a data extraction device according to the present invention. A programmable TV tuner 32 is coupled to TV cable 24 for selecting a particular TV channel. The channel to be selected is indicated by a control signal on line 34 from controller 36 under the control of input signals from a keyboard 38. The selected TV channel is then passed to a programmable amplitude modulated (AM) tuner 40. Tuner 40 is programmed by a control signal from controller 36 on line 42. TV tuner 32 selects one of the TV channels shown in FIG. 3 and AM tuner 40 selects one of the subchannels shown in FIG. 4. The selected subchannel is then passed to a data decode circuit 44. Decode circuit 44 converts the analog signal back into digital data and supplies the data to a memory 46. The contents of memory 46 are provided to a display 48 under the control of controller 36 and keyboard 38.

FIG. 5 shows a combination flowchart and block diagram illustrating the movement of information through a system according to the present invention. The information is first divided into segments consistent with the desired user access speed, as discussed below (step T1). The master index is then laid out (step T2). Each segment of the data is then assigned to a subchannel, and subchannel and channel identifiers are assigned within the master index (step T3). Groups of subchannels are then assigned to particular TV channels (step T4). The digital data is encoded as an analog carrier (step T5). Each analog data signal is then mixed with its corresponding channel carrier to produce the various channels (step T6). The subchannels are recorded on videotape to produce mixed repeating loop sources (step T7). The output from the repeating loop sources are mixed through CATV mix equipment and broadcast via cable (step T8).

As noted above, there are several alternates to the method set forth in FIG. 5. For instance, each channel can be stored digitally in RAM. That RAM can be a dedicated RAM of a subchannel processor unit which accesses the total data base and in real time processes the encoded subchannels. In addition, the transmission over cable is only one of many possible transmitting mechanisms which are compatible with transmitting an analog signal.

On the receiving end, microprocessor 36 defaults to selecting the master index subchannel on start-up and displays the information on display 48. The user then selects the desired information topic and inputs the selection through keyboard 38. The tuning modules 32 and 40 are then locked onto the desired channel and subchannel and data is routed through decode electronics 44. The digital data from decoder 44 is loaded into RAM 46 and a first block is displayed on display 48. The user can then step through the selected information by appropriate inputs on keyboard 38 under the control of microprocessor 36.

The transmitted data consists of three primary levels; the master index, the specific content indexes and the subchannel contents. The master index contains data which is encoded into the first few subchannels within the first channel. This index relates subsequent indexes or contents to the receiving device in a way which allows for user selection of desired content. (Actual channel and subchannel tuner manipulation is transparent to the user.) The number of channels consumed by the master index is determined by the following formula which is utilized throughout the system:

$$\frac{\text{Total Data Per Subject (in K bytes)}}{\text{Desired User Access Time (in seconds)}} / 4{,}000 \text{ (bytes/sec/per sub)} = \text{number of required subchannels}$$

Example: A master index is 20K bytes long, desired user access is 5 seconds, number of subchannels=1. The master index repeats on channel 1, subchannel 1 every 5 seconds.

The capacity to vary the user's access time allows the transmitter to adjust for the nature of the information and user, not just the hardware. For example, as an alternate to a conventional hard copy reference library the average access time can run into a few minutes and still be much faster than the user could otherwise obtain the information.

The master index contains and provides channel, subchannel, and timing information on all subject groups moving throughout the system. A subject group could be an encyclopedia or a magazine. Basically, a subject group is an autonomous field of information.

Similar in function to the master index, the sub-indexes contain and provide internal definition and selection within the subject group. They are represented (channel, subchannel, time) by the master index and provide the same information with respect to their group contents. They utilize the same formula for sub-channel and time occupation.

Information is arranged by any desired method of local indexing relevant to the type of information. An overall group of information is then broken into repeating fragments commensurate with the intended access time and multiplexed into the subchannels. The sub-index contains the subchannel identifications as relates to the method of indexing. The sub-index also contains time identifiers which can be used to locate a specific component of a subchannel's information content which in turn instructs the receiver to "RAM-trap" data in a specific way at a specific time, relative to timing signals. This has the advantage of allowing the receiving end to automate the refilling of its RAM devices consistent with user need thereby decreasing the requisite resident RAM volume.

In the case of special proprietary information or software a user is required to input a particular code number obtained by mail or phone in order to allow an otherwise "invisible" group to be accessed.

In the case of real time information, such as music or voice, such information is simply assigned a subchannel and the master index updated to so designate.

A personal computer, electronic book (see copending application serial no. 06/821,580) or any number of other devices containing the receiving and decoding data extraction device of FIG. 2 can provide a user with access to the pipeline's resources. Once activated, the extraction device defaults to the master index, known to be located at channel 1, subchannel 1. The user is presented with a "table of contents" or "index guide" from which he can select, by cursor movement or keyboard entry, the information with which he is concerned.

The index, at this point analog, is converted to digital for display and subsequent operations by the decoding module. All subsequent selections are similarly decoded.

Transparent to the user, his selection is equated by an operating system resident within the extraction device to a given channel and subchannel. The operating system translates his selection and digitally instructs the random access frequency tuning devices to tune in the appropriate TV channel and subsequently the appropriate subchannel. This provides the user with a sub-index with which he operates in a similar fashion, selecting his area of interest.

Remaining user transparent, the extraction device also activates a RAM-trap or RAM-cache which when full displays the user's desired information. The firmware also provides the user the ability to automate further extractions. For example, while reading a lengthy document, the system will keep track of the user's progress and "refill" RAM transparent to his actions.

From a reception perspective a user, or a few thousand users, can access up to 6,000 distinct and separate areas of information, each such area moving data at 4K bytes per second. Each user has random access over the whole field and the process of interface to the data is as simple as operating a hardcover book.

Each data carrying subchannel operates at preferably 20 KHz. The sine wave signal can be reliably detected and bandpass isolated from the master 5 MHz channel by doubling its base rate and therefore generating a carrier frequency of 40 KHz. With conventional mix oscillator multiplexing, this provides for up to 75 such subchannel carriers allowing for a subchannel guard band of 26 KHz, approximately 50% of the carrier's frequency.

Operationally, a transmitter or distributor will go through two multiplexing stages. The encoded analog signals produced through the system described previously, will be assigned specific subchannels by the designations of the master index. The information, in its communicable analog form, is subsequently loaded into a preferred method for time recycling (such as tape) and then multiplexed together as indicated above to create 5 MHz packages. The 5 MHz package can either be recorded or sent directly to a standard CATV multiplexer which then inserts each such 5 MHz package into the delivery medium.

Where information is redundantly replicated for similar concerns, such as educational or reference libraries, video tape systems in concert with a CATV multiplexer can effectively transmit or distribute a mass of information over a common cable to thousands of users.

A stand-alone data extraction device could be provided with a simple keyboard and rf modulator to allow any television set to act as a display device. The same discrete device could also be used without the modulator to provide a controller to load audio information to traditional audio recording or amplifying devices.

From a distribution perspective, a cable operator could become a distributor for reference information, software, literature, narratives, or music. Even using 10 of the many existing cable blanks would mean a delivery capacity of 240 megabytes of information per minute.

In dedicated applications such as hospitals, educational institutions and industrial complexes, the cost of using a service to record the information, or of purchasing a multiplexing data transmission device, would be well returned by the economy of access provided each individual.

FIG. 6 shows encoder 14 of FIG. 1. The encode electronics or encoder 60 of FIG. 6 consists of four basic blocks: A programmable oscillator 62, a square wave to sine wave converter 64, a data synchronizer 66 and a modulator 68.

Programmable oscillator 62 generates a square wave at the frequency to be encoded. This is the carrier frequency, and is programmable through several speed select, or frequency control, lines 70 which are controlled by a microprocessor. Programmable oscillator 62 also generates other timing signals which are synchronized with the carrier square wave. One of these timing signals, data clock 72, is used to control the transfer of each bit of data from the microprocessor to encode electronics 60.

Square wave to sine wave converter 64 converts the carrier square wave from programmable oscillator 62 into a sine wave at the same frequency. The resulting sine wave is the sine wave which will be amplitude modulated with data.

Data synchronizer 66 ensures that each new bit of data from the microprocessor which reaches modulator 68 is synchronized with the beginning of a half-cycle of the carrier sine wave.

Modulator 68 alters the amplitude of each half-cycle of the carrier sine wave to reflect the state of the associated data bit. A digital '1' is represented by a full amplitude half-cycle of the carrier. A digital '0' is represented by an attenuated half-cycle of the carrier.

The signal out of modulator 68 is an amplitude modulated sine wave which carries one bit of digital information in each half-cycle. Depending on the carrier frequency selected, this signal is suitable for recording on audio magnetic tape, or transmission via phone lines, or transmission via any other medium which will carry amplitude modulated analog signals. Two or more copies of the encode electronics can be used to transmit or record two or more channels of encoded data simultaneously.

Encode electronics 60 of FIG. 6 is shown in more detail in FIG. 7. Programmable oscillator 62 of FIG. 6 consists of a crystal oscillator 88, a programmable rate divider 90, a divide by 25 circuit 92, and a divide by 2 circuit 94.

Crystal oscillator 88 provides a stable high frequency square wave from which all other timing signals for the encode electronics are derived.

Programmable rate divider 90 uses the square wave from crystal oscillator 88 to generate a slower square wave, at a frequency which is programmable by a microprocessor through several frequency select logic inputs 96. The square wave output from programmable rate divider 90 is at a frequency which is 25X the intended data rate, and 50X the intended carrier frequency.

Divide by 25 circuit 92 creates a square wave, with a frequency equal to the intended data rate, from the output of programmable rate divider 90. This signal is used as a data clock 98 to control the transfer of each bit of data from the microprocessor to the encode electronics.

Divide by 2 circuit 94 creates a square wave, with a frequency equal to the intended carrier frequency, from the output of divide by 25 circuit 92.

A square wave to sine wave converter 100 is a low pass filter which allows the fundamental frequency of the carrier square wave to pass, and blocks or attenuates the higher frequency components of that square wave. The resulting output is a sine wave at the frequency of the incoming square wave. This low pass filter is a switched capacitor type which utilizes a clock to control the frequencies it will pass and the frequencies it will block. The clock which is used to control the characteristics of this filter is the square wave from the programmable rate divider. Thus, when the microprocessor selects a new frequency through the rate divider, this filter's characteristics are changed to match the intended carrier frequency.

Data synchronizer 66 of FIG. 6 is simply a latch 102 which transfers each data bit from the microprocessor to the modulator at the beginning of a new half-cycle of the carrier. This is accomplished by clocking synchronizer latch 102 with the square wave output from divide by 25 circuit 92.

Modulator 68 of FIG. 6 is simply an analog switch or multiplexer 104 which is controlled by the data from data synchronizing latch 102. The multiplexer 104 selects either a full-size signal from square wave to sine wave converter 100, or an attenuated version of that same signal from an attenuator 106, depending on the state of the data from synchronizing latch 102. The full sized signal is selected when the synchronized data is a '1', the attenuated signal is selected when the synchronized data is a '1'. The output of multiplexer 104 goes to a final amplifier (not shown). The output of this amplifier is suitable for transmission or recording.

FIG. 8 shows data decode section 44 of FIG. 2. The decode electronics or decoder 74 of FIG. 8 consists of five basic blocks: A coarse automatic gain control 76, a distortion compensation circuit 78, a timing synchronizer 80, a data recovery circuit 82 and a data latch 84.

Coarse automatic gain control (AGC) 76 provides a signal of acceptable amplitude compensating for gross variations in the amplitude of the raw incoming signal from one of source interfaces 36, 42, 46 or 48. AGC 76 compensates for conditions such as an inferior signal from a tape playback, or a low volume transmission from a phone line.

Distortion compensation circuit 78 attempts to remove the effects of distortion which is introduced by a particular type of recording or transmission system, and restore the signal to nearly it's original condition. By switching between several types of distortion compensation blocks, circuit 78 handles signals from dissimilar sources.

Timing synchronizer 80 detects and locks on to the frequency of the incoming sine wave carrier and provides timing and logic signals which are synchronized with that carrier. One of these timing signals, decode data clock 86, is used by data latch 84 to capture data bits in the center of each half-cycle of the carrier, where the encoded bit's state is most clearly defined. Decode data clock 86 is also sent to the microprocessor to indicate that a new data bit is waiting.

Data recovery circuit 82 senses the state of the data encoded in each half-cycle of the carrier. This circuit tracks or remembers the amplitude of an encoded '1' and follows changes in that amplitude so that digital '1's and '0's can be differentiated reliably from within a distorted signal.

Finally, data latch 84 latches the data state detected by the data recovery circuits, and holds that data state for the microprocessor until the next data bit is ready. Each new bit is latched in the center of it's half-cycle, and is held until the center of the next half-cycle of the carrier occurs.

The decode electronics of FIG. 8 are shown in more detail in FIG. 9.

A coarse automatic gain control circuit 108 controls the amplitude of the incoming signal to ensure that it is within limits which the rest of the circuitry can deal with.

A distortion compensation section 110 consists of active filters; a phase equalizer 112 and a low pass filter 114 which attempt to compensate for phase distortion in the signal which would have been introduced by the transmission or recording medium, as well as any extraneous signals which may have been introduced. These are switched capacitor type filters, similar to the type described previously regarding square wave to sine wave converter 100. As such, these filters are tuned for the frequency of the expected carrier when programmable rate divider 90 of the encode section is set. The signal out of section 110 looks more like the original encoded sine wave than the signal in.

A timing synchronizer 116 consists of a band pass filter 118, a limiter 120, and a phase-locked-loop 122 which includes a programmable rate divider 124. Band pass filter 118 and limiter 120 attempt to reconstruct the original carrier square wave from the incoming signal. Band pass filter 118 is a tunable filter like the one discussed earlier. Filter 118 is tuned to the expected carrier frequency when the encode circuit's programmable rate divider 90 is set.

Phase-locked-loop 122 uses this reconstructed carrier to synchronize it's oscillator with the carrier being received, tracking minor variations in the carrier frequency. The output of phase-locked-loop 122 is a square wave of higher frequency than the carrier frequency, which is locked to the carrier.

The output of the oscillator of phase-locked-loop 122 is sent to programmable rate divider 124. Rate divider 124 is set by the microprocessor for the expected carrier frequency, and controls the frequency which phase-locked-loop 122 will lock on. The output of rate divider 124 goes to phase-locked-loop 122 to control the lock frequency, and to data latch 126 to control the capture of each data bit as it is extracted from the carrier.

A data recovery section 128 consists of a zero reference clamp 130, an absolute value circuit 132, a '1' level tracking circuit 134, and a comparator 136.

Due to AC coupling of the incoming signal, and the asymmetry associated with encoding one bit per half-cycle of the carrier, DC offsets are introduced into the signal. These offsets vary as the content of the data in the carrier varies. This offset can move the center of the signal up or down from 0 volts enough to cause errors in recognition of encoded data. Zero reference clamp 130 serves to rectify this problem. Reference clamp 130 works in concert with '1' level tracking circuit 134 to re-reference the encoded signal to ground (OV) whenever a '0' level half cycle is detected. This 're-referencing' on the recognition of '0' level half-cycles helps to minimize errors caused by data induced DC offsets. The output of the reference clamp 130 goes to absolute value circuit 132.

Absolute value circuit 132 makes all negative going half-cycles positive. This reduces the amount of circuitry required to recognize '1's from '0's since all half-cycles become positive going. The output of absolute value circuit 132 goes to both '1' tracking circuit 134 and data comparator 136.

'1' tracking circuit 134 follows the amplitude of the incoming signal during each half cycle which is encoded as a '1', and generates a signal which is approximately one-half the amplitude of a '1' level. The output of the '1' tracking circuit is a slowly varying DC signal which tracks the average amplitude of '1' level half cycles, and is used by data level comparator 136 to differentiate '1's from '2's.

Data level comparator 136 compares the reference level provided by '1' tracking circuit 134, to the signal from absolute value circuit 132. The output of data comparator 136 is a digital signal which always indicates the relationship of the two signals. The output of comparator 136 reliably indicates the state of the encoded data bit in any half-cycle of the carrier, when it's output is sampled at the center of the half-cycle. The output of comparator 136 goes to data latch 126 for just such sampling control.

Data latch 126 receives data levels from data comparator 136, and is clocked by the phase-locked square wave from programmable rate divider 124. This clock 138 from rate divider 124 causes data latch 126 to latch and hold the value of each data bit at the center of each half cycle of the incoming carrier, thus ensuring that recovered state of the data is valid at the time it is latched. The data in latch 126 is held constant, so that the microprocessor can retrieve it, until the center of the next half-cycle occurs. Clock 138 also signals the microprocessor when each new data bit is available.

FIG. 10 shows in block diagram form the digital electronics of FIG. 2. A microprocessor 142 is coupled to a 19 bit address bus 144 and an 8 bit data bus 146. These busses provide for the transmission of data and control signals among the various elements of the electronic book. A keypad 148 provides input signals through a keypad control circuit 150 to microprocessor 142. A liquid crystal display 152 is controlled by a controller 154 using data from a display memory 156. A ROM memory 158 and a RAM memory 160 are also provided.

The transmission and receiving of signals from outside the digital electronics module is controlled by a universal synchronous/asynchronous receiver/transmitter (USART) 164. This circuit provides data and control signals along data bus 146 to microprocessor 142 under the control of designated lines of address bus 144.

Microprocessor 142 initializes liquid crystal display controller 154 by writing specific set-up values into the registers of controller 154. Once initialized, controller 154 continuously reads the contents of display memory 156, setting each dot in display 152 'on' if the associated bit in memory is a '1', and 'off' if the bit is a '1'. Display 152 contains 640×400 or 256,000 dots which are controlled by the first 32,000 bytes of display memory 156 (8 bits each).

To modify a dot on the display, microprocessor 146 changes the state of the correct bit in the correct byte of display memory 156 for the desired dot. Microprocessor 142 is able to read from, or write to display memory 156 at any time.

The signal from the selected subchannel is conditioned and decoded by the decode electronics 74 (FIG. 8). After this conditioning and decoding, the digital electronics are presented with a serial stream of data and a clock which identifies the locations of the bits within the stream. These signals go to the serial data interface (USART) 164. Interface 164 converts the serial data stream into data bytes, interrupting microprocessor 142 whenever a new byte has been assembled.

Keyboard control 150 is made up of a set of 6 column drivers which microprocessor 142 can turn 'on' or 'off', and eight bits of row status which the microprocessor can read. These rows and columns make up an array of 48 possible key depressions which microprocessor 142 can sense.

To read keyboard 148, microprocessor 142 turns 'on' one of the column drivers, and reads the row status bits. Each row status bit which shows a '0' indicates a key which is pressed. This operation is repeated for all columns.

The row status bits are also gated together so that an interrupt to microprocessor 142 is generated when any key is depressed.

RAM 160 (64K bytes) and ROM 158 (64K bytes) are necessary to support the basic operation of microprocessor 142. The RAM space provided is large because it is used to hold large amounts of data.

The basic function of the software in ROM 158 is to manage the flow of data. This control of data flow is managed based upon entries made by the user on keypad 148.

The data which is received is arranged in blocks. Each block of data includes a header which indicates what type of data is contained in the block, the block's position is the data stream or on tape, and any other data related to information management, which may be needed for the block type. This information is used by the software to manage the flow of data from each source of data, and manage the transfer of that data to the display in logical order.

Some of the data block types contain only management information, and no 'raw' data. These special purpose blocks contain tables of contents, page position information, and the like.

An encoded tape or data stream consists of groups of data blocks which are retrieved and operated on by the book's software. There is a structure in the way that data blocks are ordered which facilitates the management of that data by the software.

The management of several separate buffer memory areas is an important aspect of the software's operation, and underlies all other operations.

There are logically separate buffer memory in physical RAM 160 areas which the software manages. The program buffer is an area where program blocks from the tape or data stream are stored. This allows the book to retrieve application software in order to customize the book's operation for a given application. The table of contents buffer area contains all table of contents information from the leading table of contents block, and also the selection's table of contents and page specification blocks if the selection has those blocks. The software maintains this information in a separate buffer area for immediate access, whenever the user requests the table of contents, or requests a jump to another section or page. The graph buffer is an area which holds data for up to two graphic images, one associated with each of the text buffer areas. Finally, there are two source buffers. These are used alternatively to retrieve data from the selected data source. If the data retrieved is a table of contents, or page specification block, or a graphic block, the associated data is moved immediately to the appropriate special purpose buffer area.

Management information, such as the block numbers and positions of the blocks which are presently in the source buffers, is maintained by the software in another area of memory.

When the data extraction device is turned on, the software initializes all of the electronics as required for normal operation, and displays a prompt to encourage the user to use the keypad to indicate what he would like to do. From this point on, all operations are initiated through the keypad.

The keypad commands are described below. It is important to note that all of the keys on the keypad can be used by loadable application programs. This feature allows complete customization of the operation of the keypad commands.

New Source This command allows the operator to select a new or initial source of data. This source is a cable channel and subchannel. The software lists the available sources in menu form. The operator then uses the NEXT and PREVIOUS keys to select the desired source, and presses SELECT to finalize the choice.

Next and Previous These commands are used to step through the selections on any menu or table of contents presented to the user. They are also used to step through any document the user views, page by page.

Select When a menu or table of contents is displayed, this command indicates that the user has finalized his choice.

Table of Contents The table of contents command allows the operator to call up each level of table of contents to see other selections, and to jump to another section of the presently selected document, or to another document entirely.

Number Keys These keys allow the operator to select specific pages for viewing, by number.

Retrieving Data

When a new data source is selected, the software reads the first logical block from the data source.

If that block is not a program block, it contains the table of contents as described above. The entries in that table of contents block are then listed on the display. The user selects one of the entries in the list using the keypad. When a selection is made, the software finds and retrieves the first data block specified for the selection. If that block is another table of contents, the following two blocks are also retrieved. These are the page specification block, and finally the first block of displayable data.

If the first block is a program block, the program is loaded into the program buffer area, and control is transferred to it. The operation of the book is then under complete control of the application program until that program returns control to the book's resident software.

Throughout the process of retrieving data, the software alternates the use of two data buffers so that the last two blocks read are always available in memory. This allows the user to move backward or forward several pages through the text at any time without forcing the software to retrieve another data block.

Once a selection is chosen and the initial block or blocks read in, subsequent blocks are read in as the user steps through the available text. A new block is read in several pages before it is actually needed. When a graph block is encountered, it is read in, transferred to the graph buffer, and the following block is read.

When a graph has been read in, and a page is requested which falls within the range of pages which are specified for display of the graph, the graph image is copied from the graph buffer to the display, and the text for the page is placed in the remaining space on the display.

If the first block of the selection is an audio block, the remainder of the selection is transferred without the normal page management operations. The data stream is read continuously, and text and images are transferred to the display as soon as they are available. This allows the associated 'audio' track to proceed uninterrupted.

The continuing retrieval of text and graphic images is controlled by the user through the use of the NEXT PAGE and PREVIOUS PAGE keys. At any time, the user can call up the table of contents for the current selection and select a different section or page to jump to. The user can also call up the table of contents for the data stream to change selections at that level. Finally, the user can choose another data stream to change the source of data entirely.

As will be understood by those familiar with the art, the present invention can be embodied in other forms without departing from the spirit or essential characteristics thereof. For instance, a display other than a LCD could be used, or a few dedicated input switches could be used in place of a keypad. Accordingly, the foregoing embodiments are intended to be illustrative, but not limiting of, the scope of the invention which is set forth in the following claims.

What is claimed is:

1. An apparatus for providing a recirculating stream of data comprising:
   means for repetitively providing a plurality of sets of data encoded an analog signals;
   a plurality of mixers, each mixer being operative to amplitude modulate a different frequency carrier signal of a plurality of carrier signals with one of said analog signals; and
   means for mixing said modulated carrier signals for transmission over a single channel;
   wherein a first set of said plurality of sets of data encoded and mixed with a first carrier signal of said plurality of carrier signals contains indexing information for the remaining sets of data.

2. An apparatus for providing a recirculating stream of data comprising:
   means for repetitively providing a plurality of sets of data encoded as analog signals;
   a plurality of mixers, each mixer being operative to amplitude modulate a different frequency carrier signal with one of said analog signals;
   first means for mixing said modulated carrier signals; and
   second means for mixing a plurality of first mixed carrier signals for transmission over multiple channels.

3. An apparatus for providing a recirculating stream of data comprising:
   means for repetitively providing a plurality of sets of digital data; and
   a plurality of encoder means for encoding said digital data as analog signals, each said encoder means being operative to encode said digital data as an amplitude modulated sine wave with each half cycle containing one bit of data;
   a plurality of mixers, each mixer being operative to amplitude modulate a different frequency carrier signal with one of said analog signals; and
   means for mixing said modulated carrier signals for transmission over a single channel.

4. The apparatus of claim 3 wherein said encoder means comprises:
   an oscillator for generating a square wave;
   a programmable rate divider coupled to said oscillator for producing a lower frequency square wave;
   a low pass filter coupled to said rate divider for converting said lower frequency square wave into a sine wave;
   an attenuator coupled to said low pass filter for producing an attenuated sine wave; and
   a multiplexer having a first and second inputs coupled to receive said sine wave and said attenuated sine wave, respectively, said multiplexer having a select input coupled to receive said digital data.

5. An apparatus for extracting one of a plurality of sets of recirculating data, each set of data being encoded as an amplitude modulated carrier signal, a plurality of said modulated carrier signals being mixed together in each of a plurality of TV channels, said apparatus comprising:
   a TV tuner for selecting one of said TV channels;
   an AM tuner for selecting one of said amplitude modulated carrier signals;
   a keyboard for entry of input signals indicating a TV channel and carrier to be selected;
   a controller for controlling said TV and AM tuners responsive to said input signals;
   decoder means for converting an amplitude modulated carrier signal into a digital representation of one of said sets of data; and
   buffer memory means for storing a portion of one of said sets of data.

6. The apparatus of claim 3 further comprising display means for displaying the contents of said buffer memory.

7. The apparatus of claim 3 wherein said controller is operable to default to a first carrier signal containing index information.

8. A system for transmitting a recirculating stream of sets of data and extracting one of said sets of data, comprising:
   a tape encoded with a plurality of carrier frequency signals, each carrier signal corresponding to a different subchannel, each carrier signal being amplitude modulated by an analog signal representing digital data;
   a tape player for playing said tape;
   means, coupled to said tape player, for transmitting said modulated carrier signals over a TV channel;
   a TV tuner for selecting said TV channel;
   an AM tuner for selecting one of said amplitude modulated carrier signals;
   a keyboard for entry of input signals indicating a TV channel and carrier signal to be selected;
   a controller for controlling said TV and AM tuners responsive to said input signals;

decoder means for converting an amplitude modulated carrier signal into a digital representation of one of said sets of data; and buffer memory means for storing a portion of one of said sets of data; and display means for displaying the contents of said buffer memory.

9. A method for repetitively transmitting a body of digital data, comprising the steps of:

dividing said body of data into a plurality of sets of data;

creating an index of said plurality of sets of data;

encoding each said set of data and said index an analog waveforms;

modulating a plurality of different carrier frequency signals with said analog waveforms to produce a plurality of subchannels, each subchannel constituting a different one of said carrier signals modulated by one of said analog waveforms corresponding to one of said sets of data or said index, such that each of the analog waveforms is modulated by a different carrier signal;

mixing said subchannels into a single channel; and transmitting said channel.

* * * * *